US012735277B2

(12) United States Patent
Kobayashi et al.

(10) Patent No.: US 12,735,277 B2
(45) Date of Patent: Sep. 15, 2026

(54) TRANSPORT DEVICE AND ANALYSIS SYSTEM

(71) Applicant: Hitachi High-Tech Corporation, Tokyo (JP)

(72) Inventors: Hiroyuki Kobayashi, Tokyo (JP); Satoru Kaneko, Tokyo (JP); Takeshi Tamakoshi, Tokyo (JP); Yasuaki Aoyama, Tokyo (JP); Ryosuke Hoshi, Tokyo (JP); Hiroshi Watanabe, Tokyo (JP); Kuniaki Onizawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 749 days.

(21) Appl. No.: 17/928,346

(22) PCT Filed: Feb. 5, 2021

(86) PCT No.: PCT/JP2021/004435
§ 371 (c)(1),
(2) Date: Nov. 29, 2022

(87) PCT Pub. No.: WO2021/250938
PCT Pub. Date: Dec. 16, 2021

(65) Prior Publication Data
US 2023/0211964 A1 Jul. 6, 2023

(30) Foreign Application Priority Data
Jun. 9, 2020 (JP) ................................ 2020-100071

(51) Int. Cl.
*B65G 54/02* (2006.01)
*G01N 35/04* (2006.01)

(52) U.S. Cl.
CPC ............ *B65G 54/02* (2013.01); *G01N 35/04* (2013.01); *G01N 2035/0477* (2013.01)

(58) Field of Classification Search
CPC ......... B60L 13/03; B60L 15/005; B60L 15/08
See application file for complete search history.

(56) References Cited

U.S. PATENT DOCUMENTS 7,233,123 B2 6/2007 Koczara et al.
12,620,916 B2 * 5/2026 Suzuki .................. B65G 54/02
(Continued)

FOREIGN PATENT DOCUMENTS

JP 5-153704 A 6/1993
JP 2002-78391 A 3/2002
(Continued)

OTHER PUBLICATIONS

International Search Report (PCT/ISA/210) issued in PCT Application No. PCT/JP2021/004435 dated Apr. 27, 2021 with English translation (four (4) pages).
(Continued)

*Primary Examiner* — Scott A Browne
(74) *Attorney, Agent, or Firm* — Crowell & Moring LLP

(57) ABSTRACT

Provided are a transport device and an analysis system in which a stability of transport at a time of restart is further enhanced while achieving cost reduction by a position-sensorless configuration. A transport device includes: a plurality of coils 25*a*, 25*b* configured to generate a thrust to transport a transport container 20; a drive circuit 50 configured to apply a voltage to each of the plurality of coils 25*a*, 25*b*; and a calculation unit 40 configured to estimate a position of the transport container 20 based on current information when voltage pulses 80, 81 are applied to the coils 25*a*, 25*b*. When a power supply of the device is activated, the calculation unit 40 applies a voltage pulse 80 in a positive direction and a voltage pulse 81 in a negative direction to the target coils 25*a*, 25*b* so as to detect the
(Continued)

position of the transport container 20 from the current information of current flowing through the coils 25*a,* 25*b*.

8 Claims, 15 Drawing Sheets

(56) References Cited

U.S. PATENT DOCUMENTS

| | | | | |
|---|---|---|---|---|
| 2013/0073252 | A1 | 3/2013 | Yamasaki et al. | |
| 2014/0234065 | A1 * | 8/2014 | Heise | B65G 54/02<br>414/749.2 |
| 2017/0363608 | A1 | 12/2017 | Sinz | |
| 2018/0210001 | A1 | 7/2018 | Reza | |

FOREIGN PATENT DOCUMENTS

| | | | | |
|---|---|---|---|---|
| JP | 4211133 | B2 | 1/2009 | |
| JP | 5619195 | B2 | 11/2014 | |
| JP | 2017-227635 | A | 12/2017 | |
| JP | 2018-119962 | A | 8/2018 | |
| WO | WO-2019225284 | A1 * | 11/2019 | H02P 25/064 |

OTHER PUBLICATIONS

Japanese-language Written Opinion (PCT/ISA/237) issued in PCT Application No. PCT/JP2021/004435 dated Apr. 27, 2021 (four (4) pages).

Extended European Search Report issued in European Application No. 21823111.6 dated Jun. 3, 2024 (6 pages).

* cited by examiner

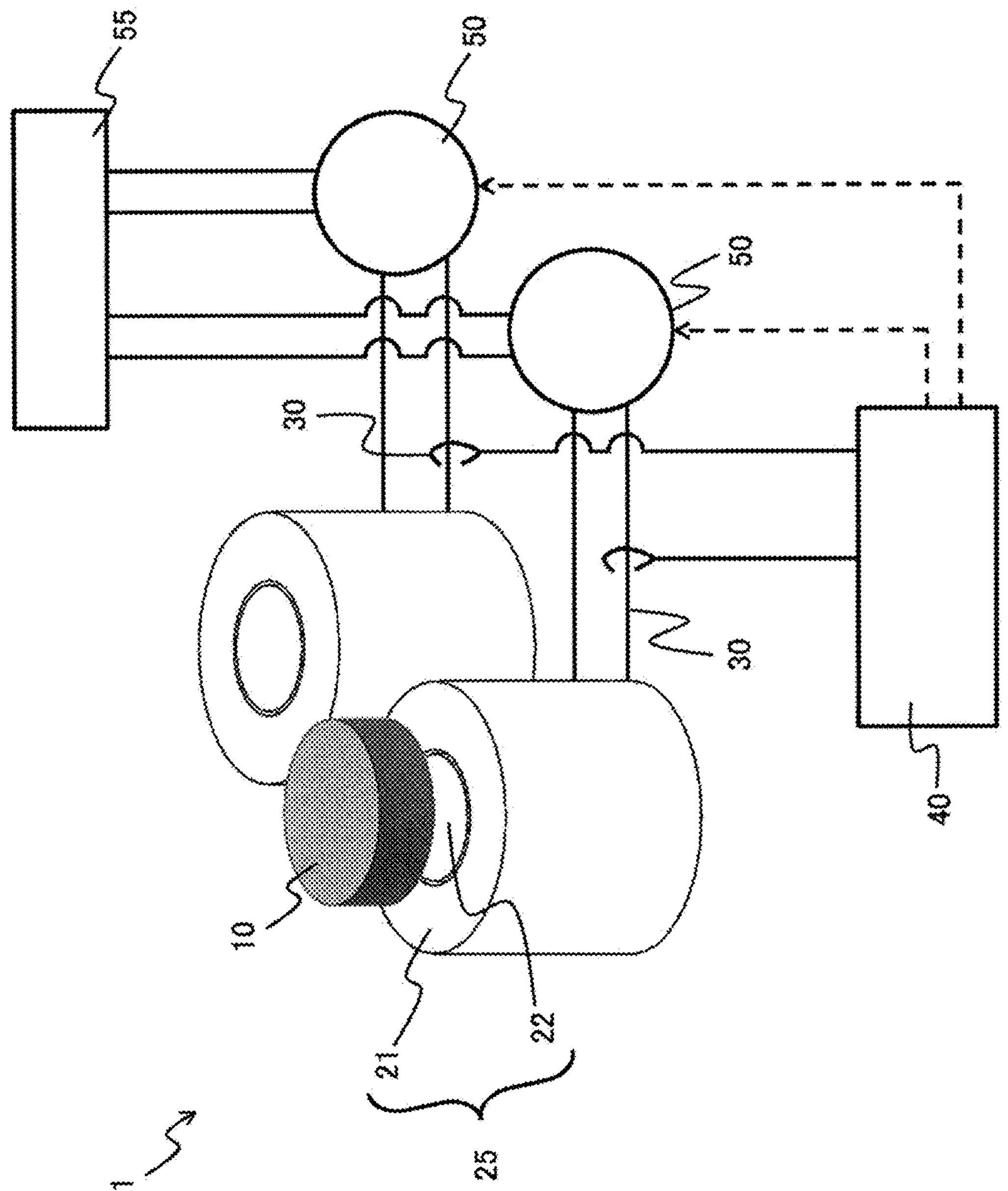
[FIG. 1]

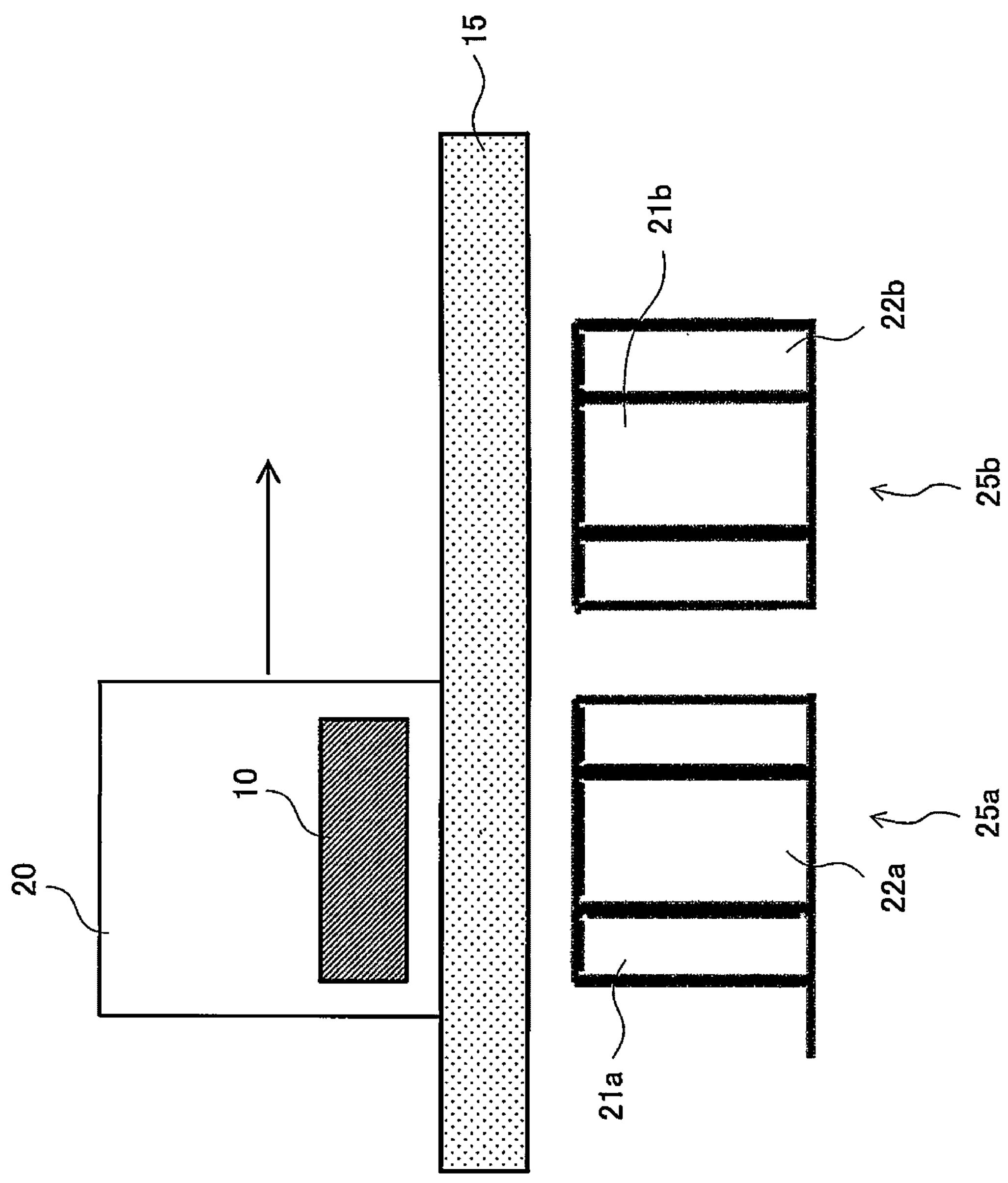
[FIG. 2]

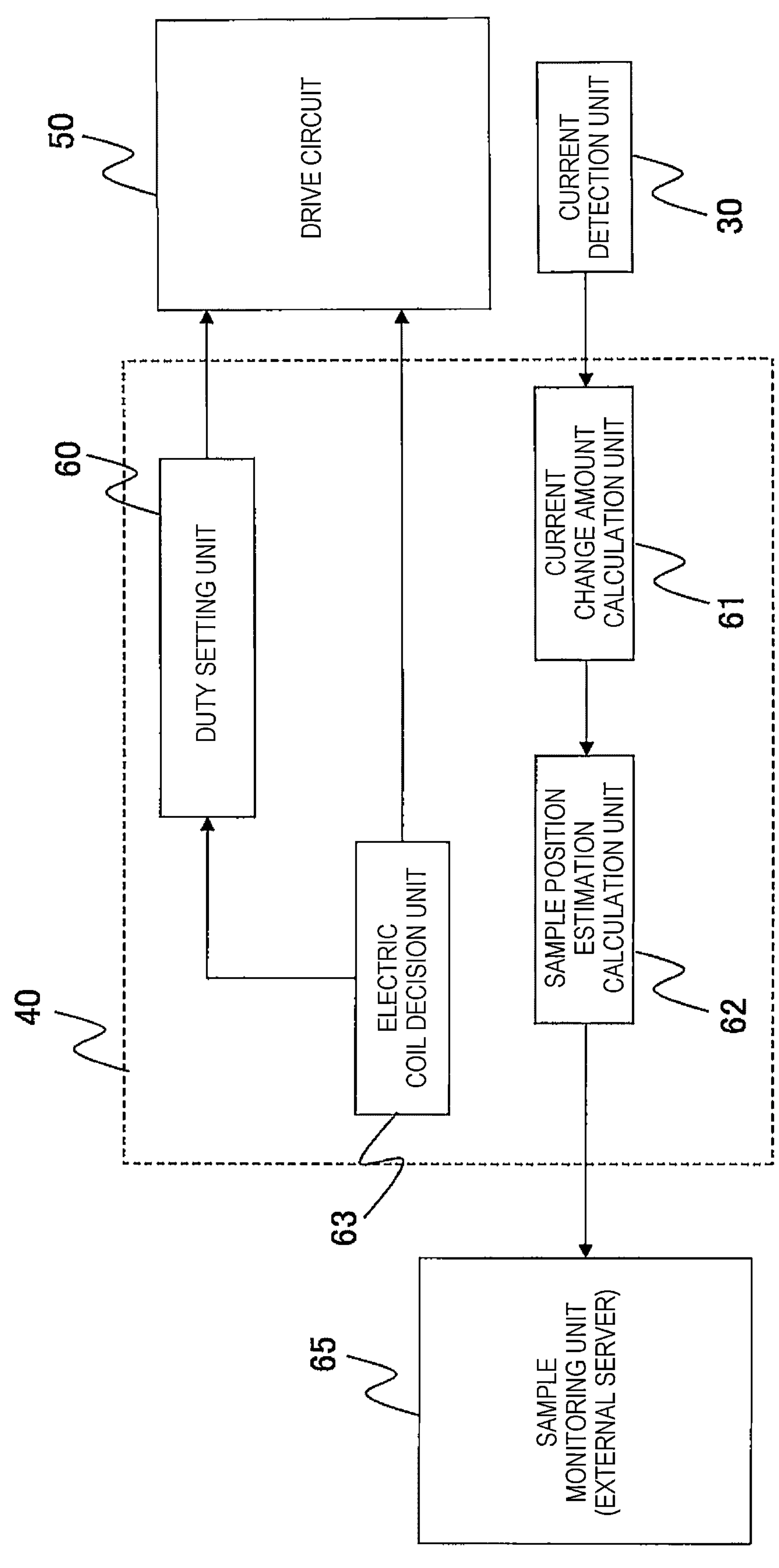
[FIG. 3]

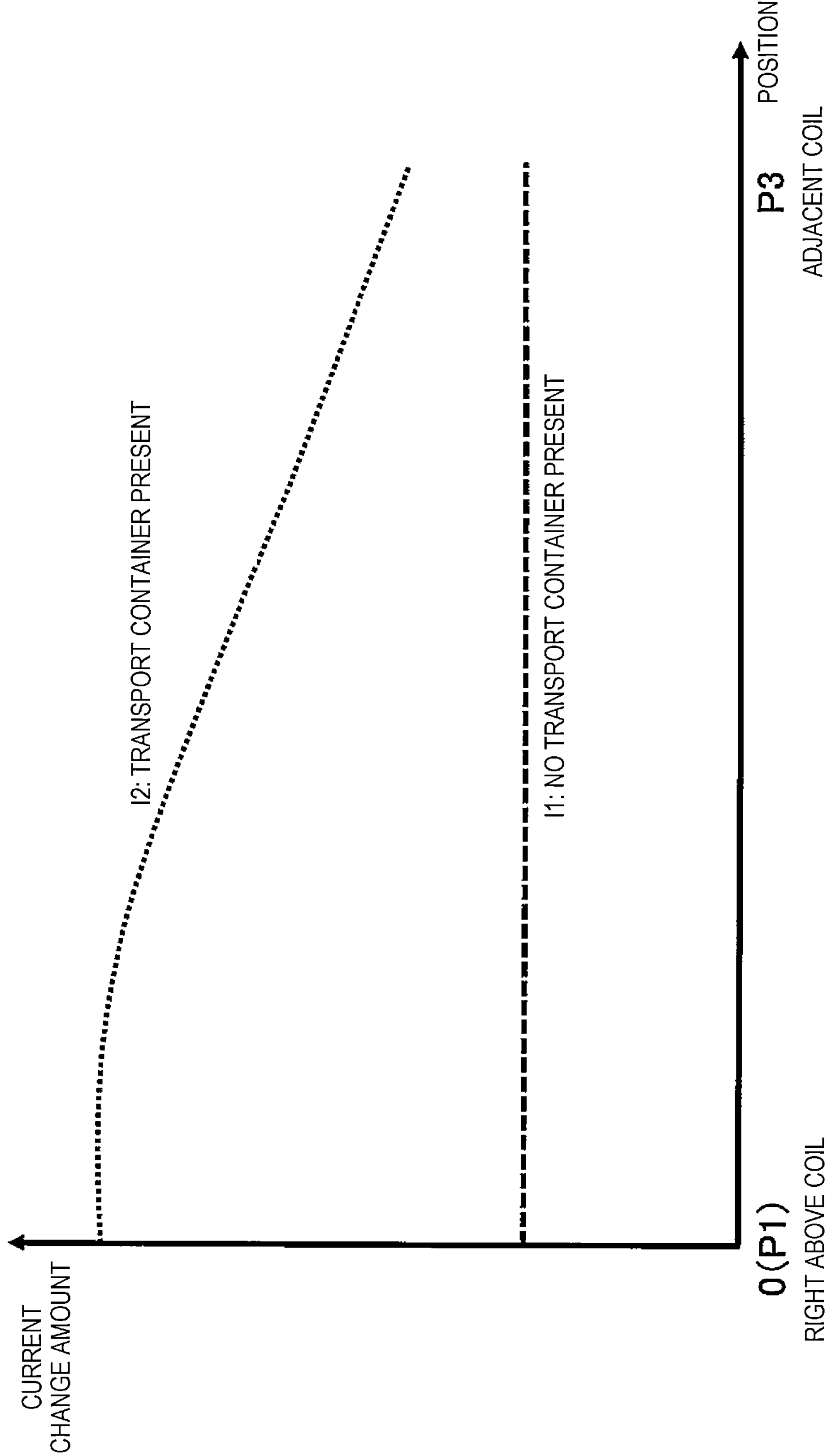
[FIG. 4]

[FIG. 5]
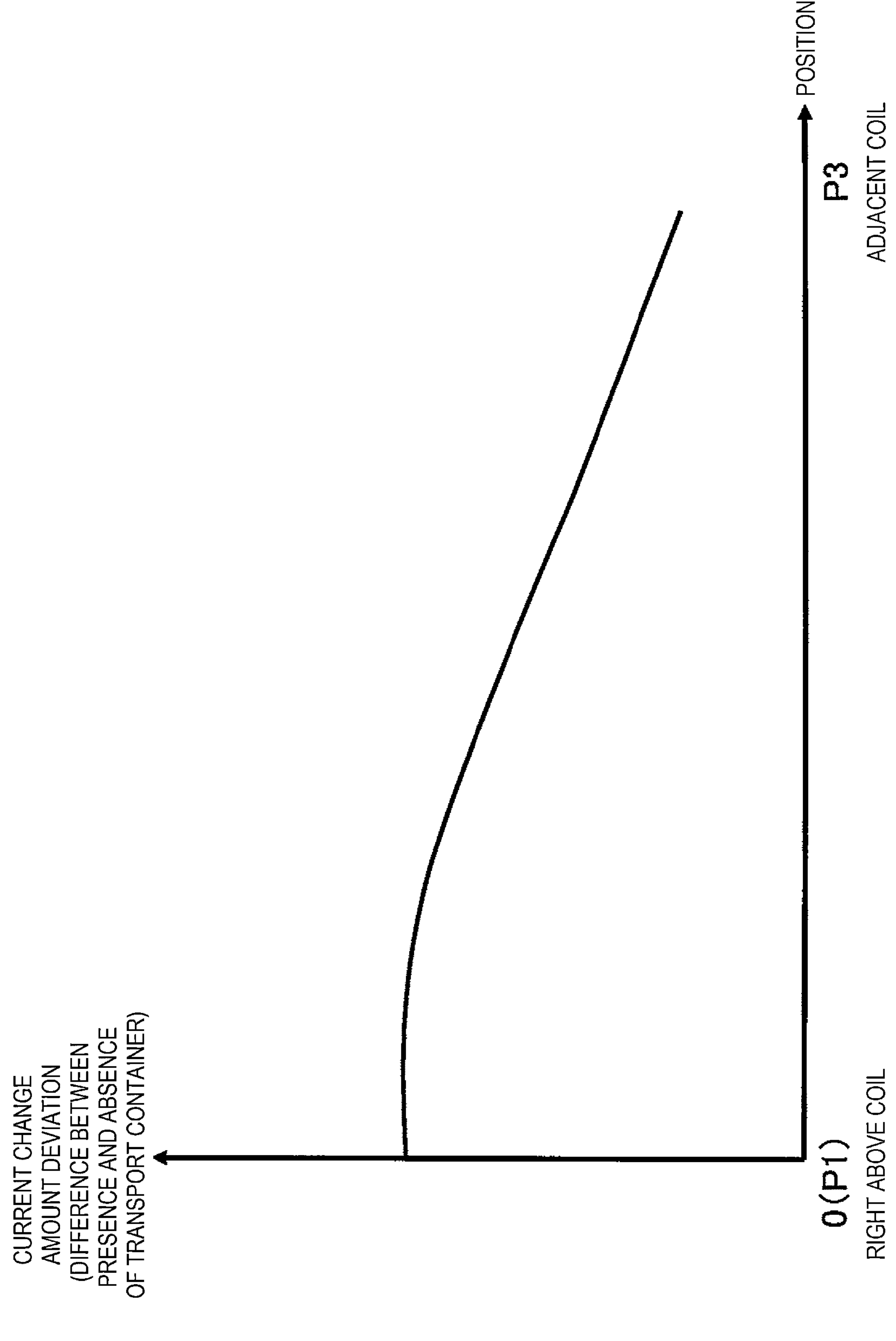

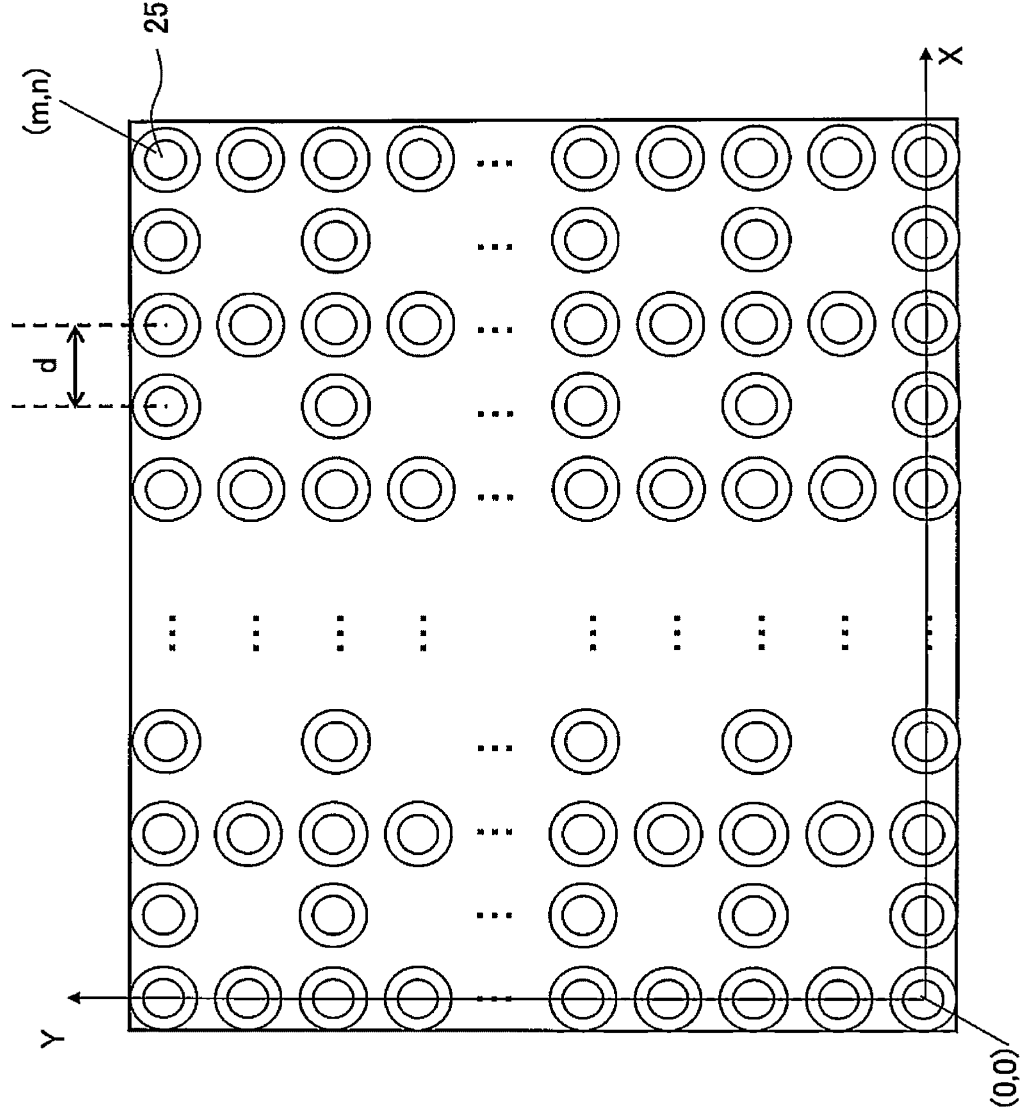
[FIG. 6]

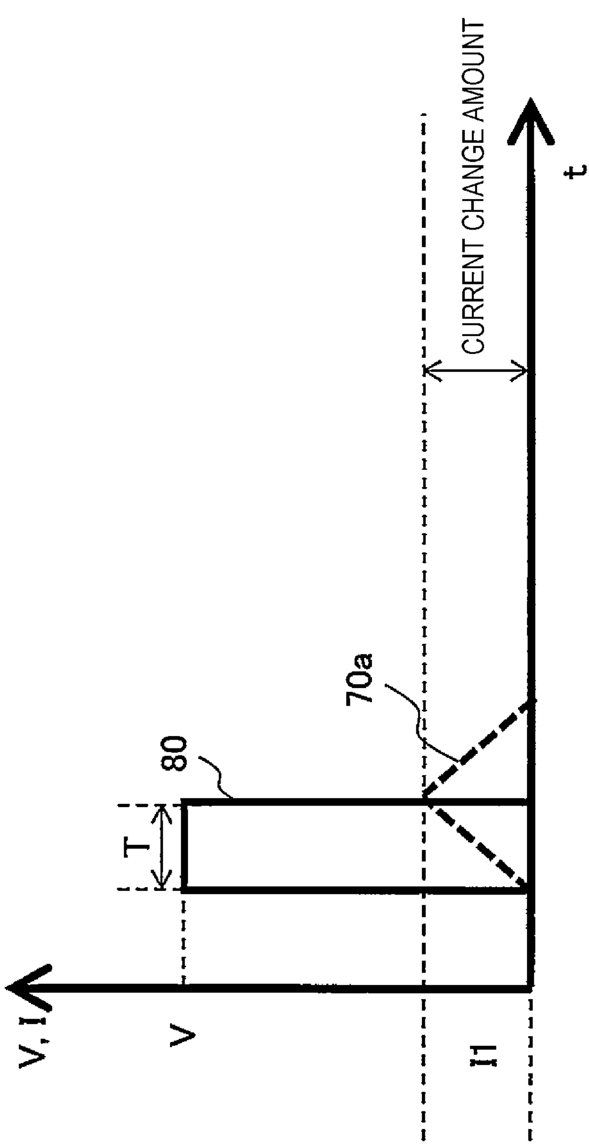
[FIG. 7]

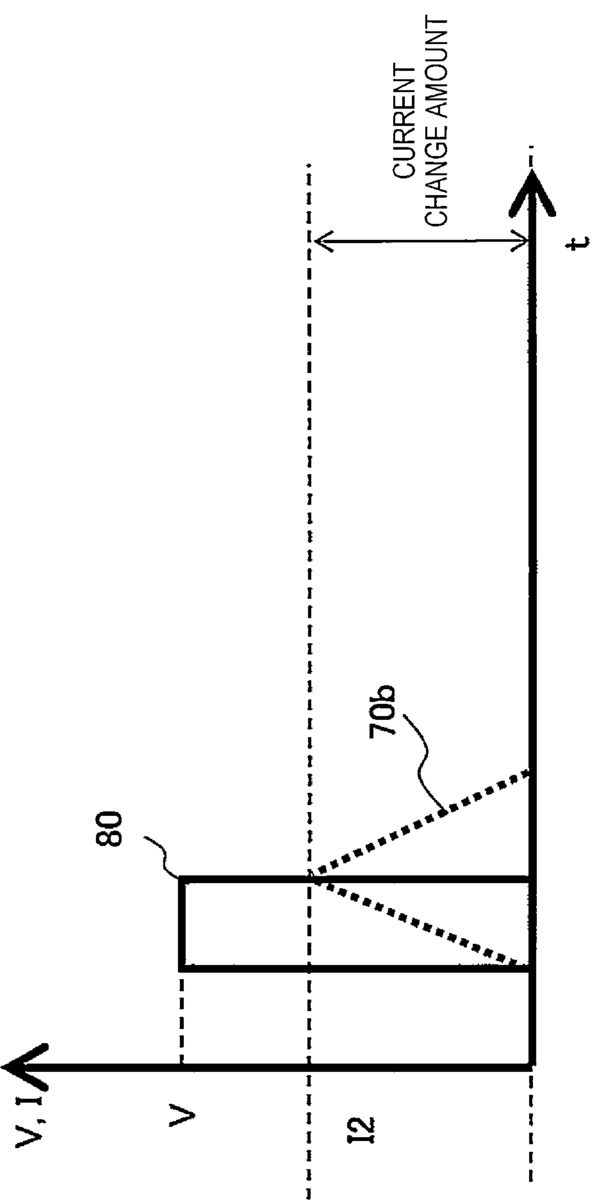
[FIG. 8]

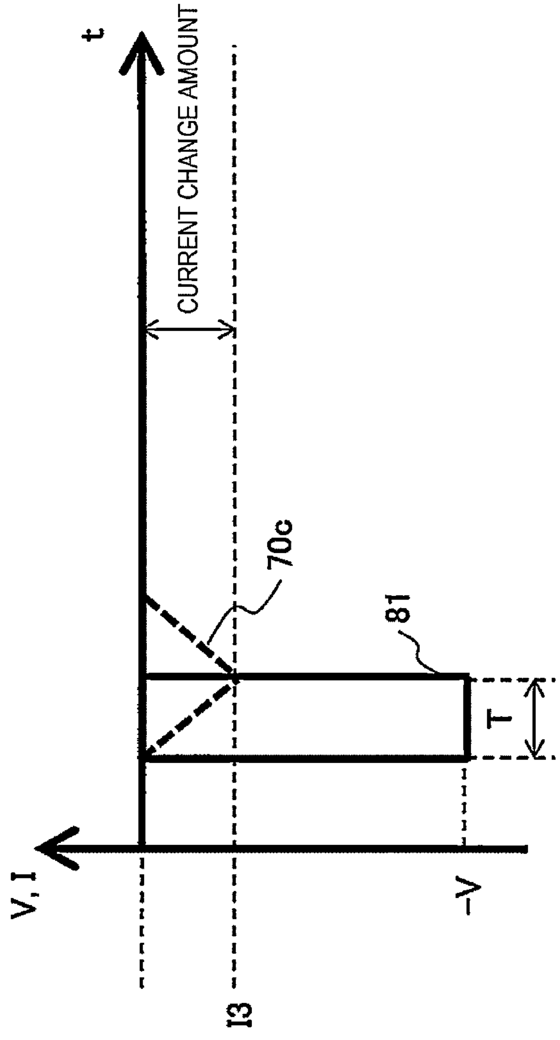
[FIG. 9]

[FIG. 10]
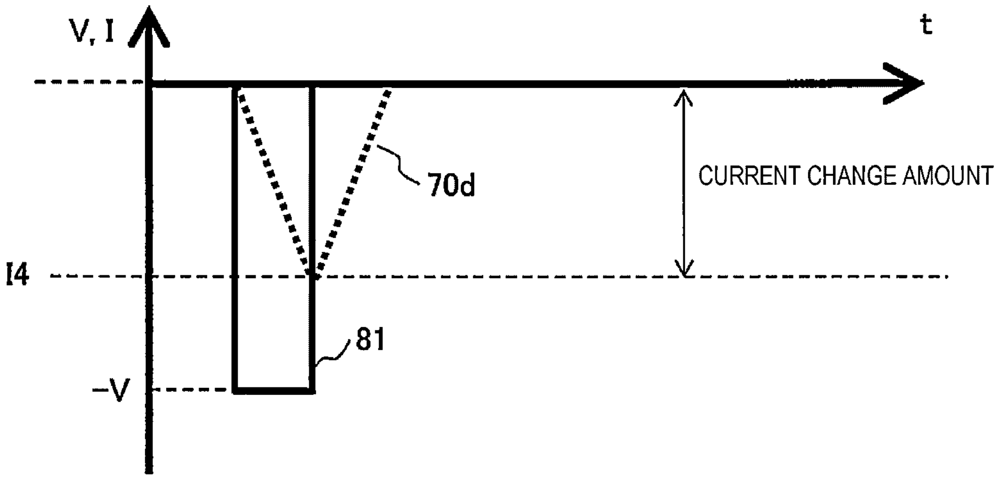
[FIG. 11]
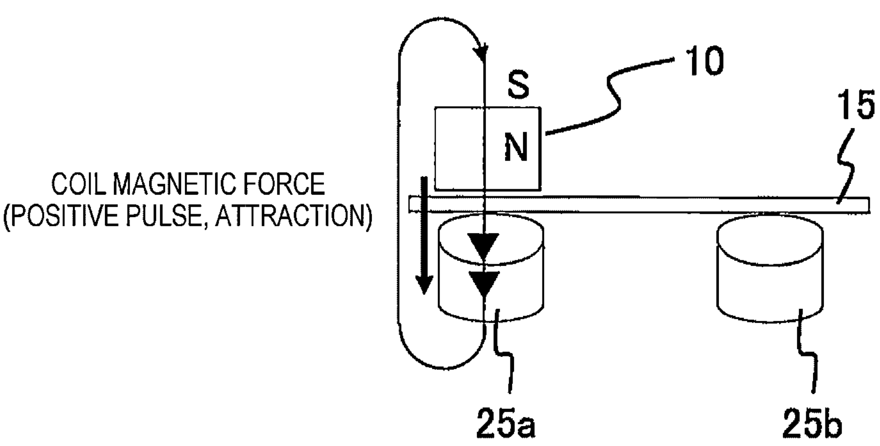
[FIG. 12]
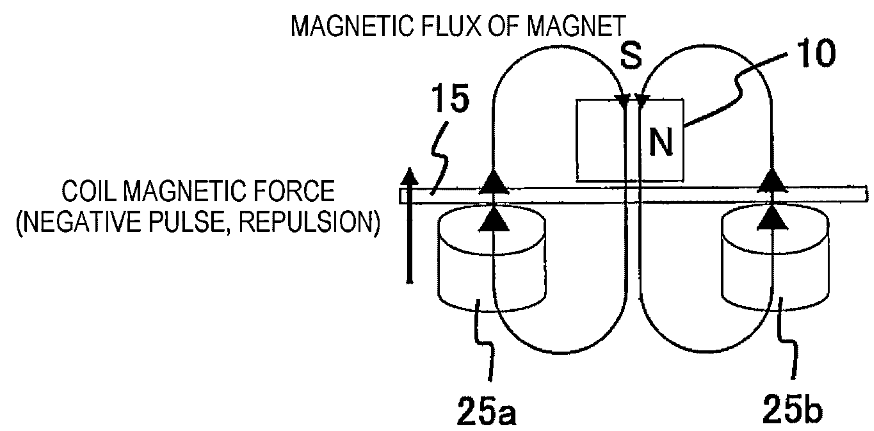

[FIG. 13]
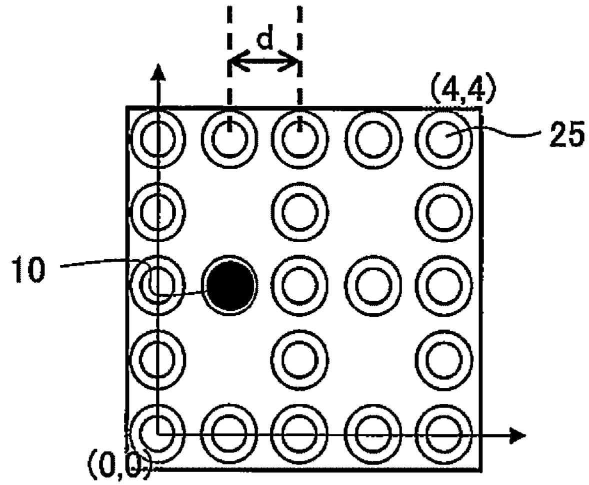
[FIG. 14]
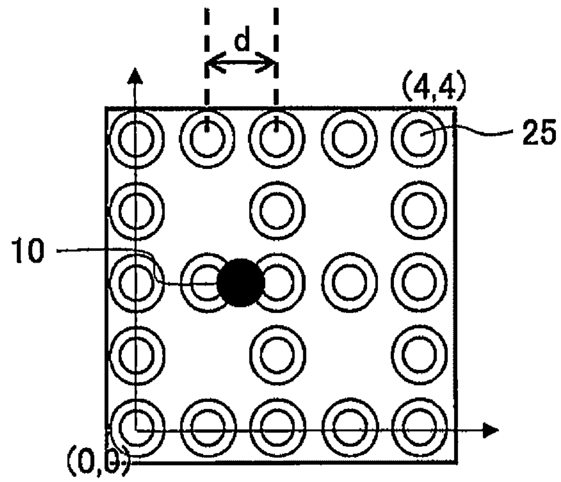
[FIG. 15]
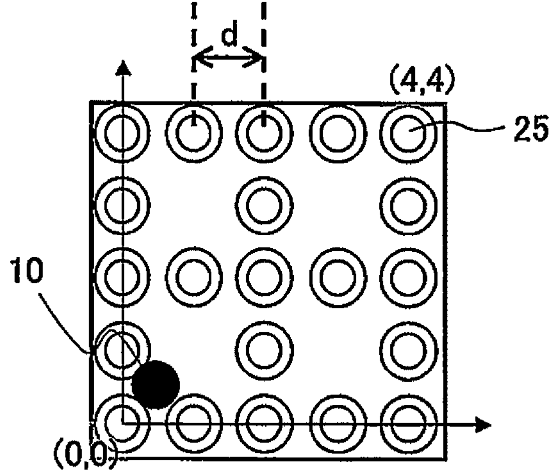

[FIG. 16]
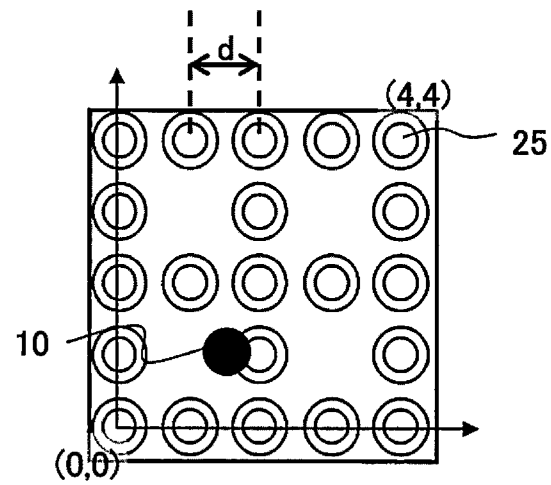
[FIG. 17]
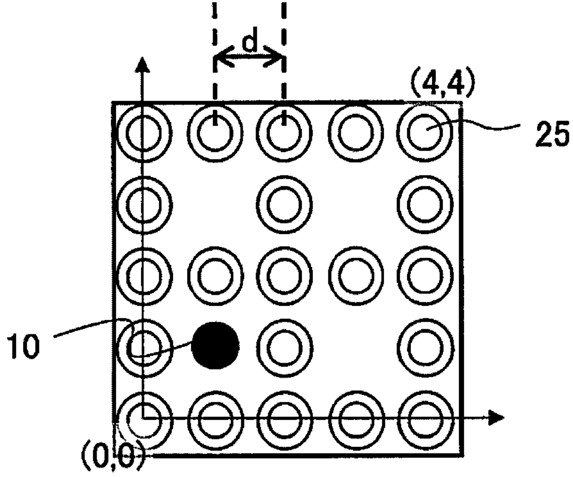

[FIG. 18]
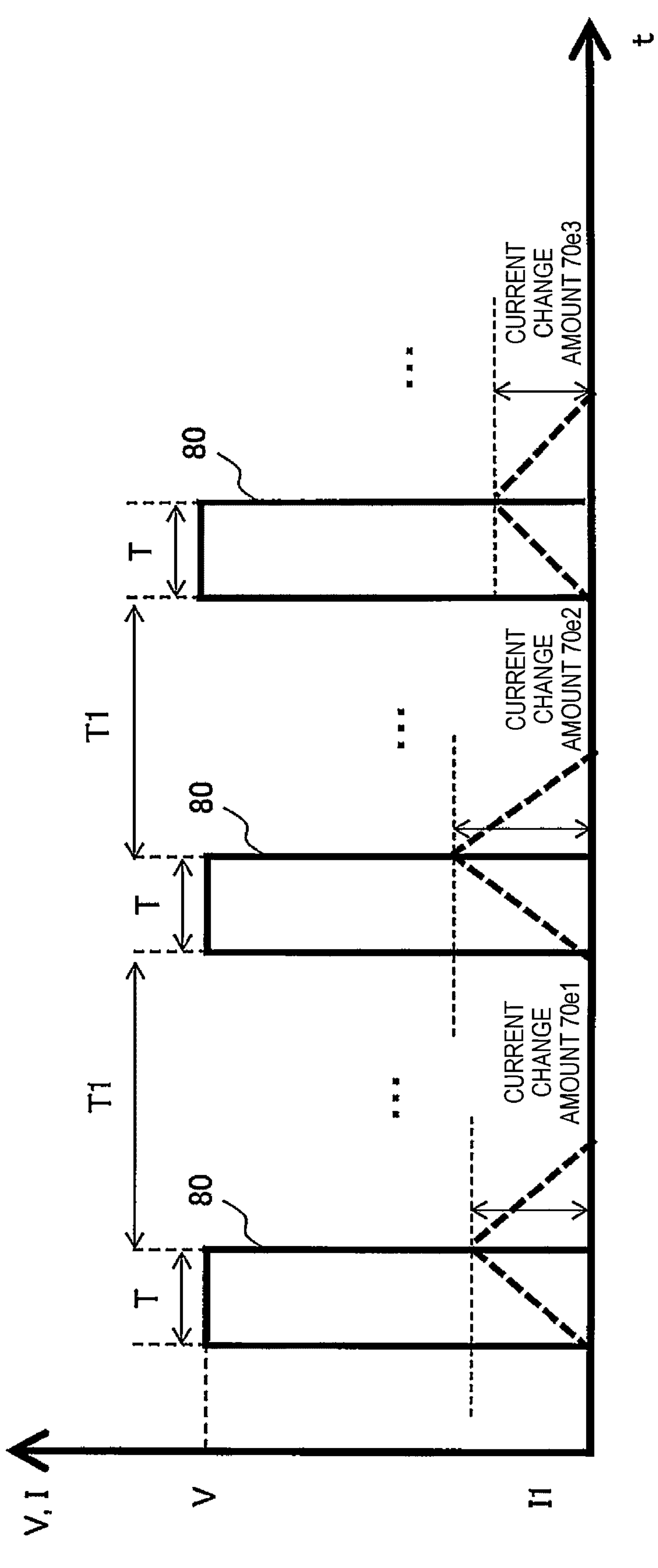

[FIG. 19]
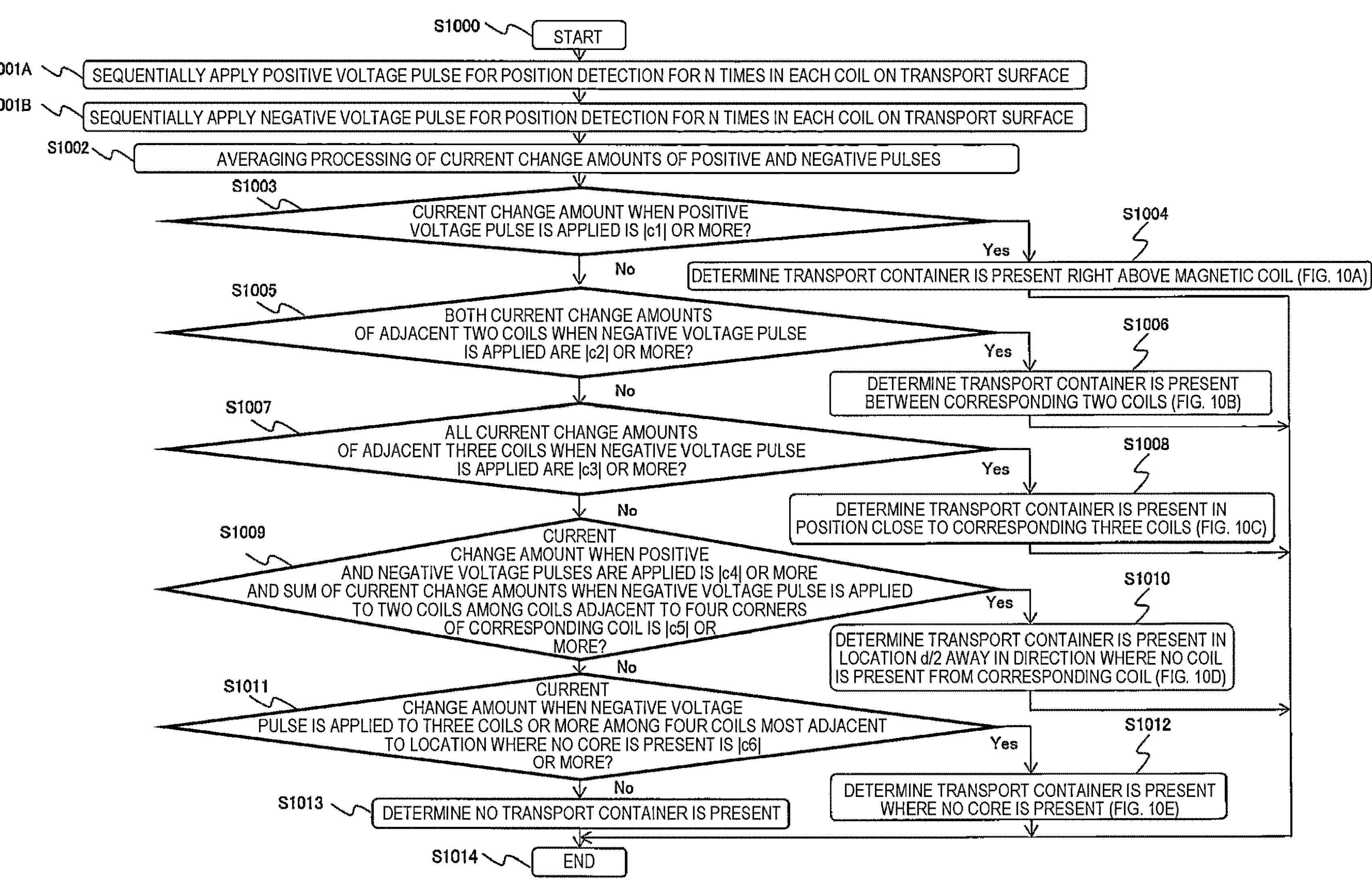

[FIG. 20]
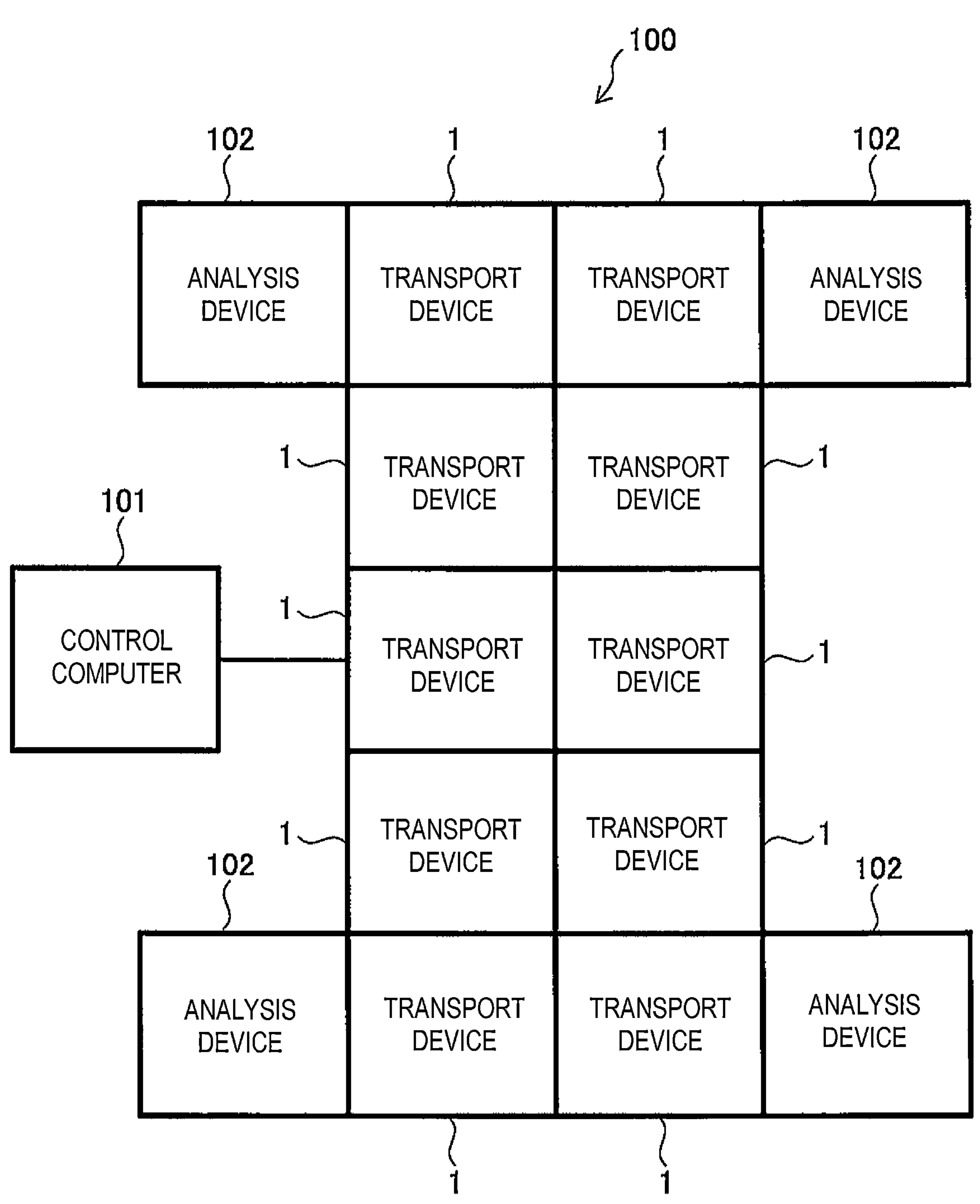

TRANSPORT DEVICE AND ANALYSIS SYSTEM

TECHNICAL FIELD

The invention relates to a sample analysis system that analyzes a biological sample (hereinafter, referred to as "sample") such as blood or urine, a transport device that is suitable for a sample pre-processing device for performing pre-processing required for the analysis, and an analysis system.

BACKGROUND ART

As an example of a laboratory sample distribution system that is highly flexible and offers a high transport performance and an operation method corresponding thereto, JP-A-2017-227635 (PTL 1) describes the laboratory sample distribution system including: a plurality of container carriers adapted to carry a sample container, each of the container carriers including at least one magnetically active device, preferably, at least one permanent magnet; a transport plane adapted to carry the container carriers; and a plurality of electromagnetic actuators adapted to apply a magnetic force to the container carriers to move the container carriers on the transport plane, the electromagnetic actuators being stationary disposed below the transport plane.

In addition, as an example of a laboratory sample distribution system in which positions on a transport plane can be recognized, JP-A-2018-119962 (PTL 2) describes the laboratory sample distribution system including: a transport plane; a plurality of sample container carriers; a driver configured to move the sample container carriers on the transport plane; and a control device configured to control the movement of the sample container carriers on the transport plane by driving the driver such that the sample container carriers move along corresponding transport paths, in which a plurality of optically recognizable geometric shapes are placed on the transport plane, each geometric shape representing a dedicated field on the transport plane.

CITATION LIST

Patent Literature

PTL 1: JP-A-2017-227635
PTL 2: JP-A-2018-119962

SUMMARY OF INVENTION

Technical Problem

In sample processing devices for a clinical test, a sample such as blood, plasma, serum, urine, or other body fluid is evaluated for instructed analysis items. As the sample processing devices, a plurality of devices having respective functions are connected such that the respective steps can be automatically processed. That is, in order to rationalize operations in a laboratory, analysis units in a plurality of fields of analysis such as biochemistry or immunity are connected through a transport line and operate as one device.

In the related art, a belt driving type transport line is mainly used, and when the transport is stopped due to some kind of abnormality during the transport, a sample cannot be supplied to devices provided downstream of the stop position.

In addition, due to the advancement of medical care and the development of an aging society, diversification of sample processing contents and an increase in the number of samples are expected, and various samples need to be transported with higher speed.

Accordingly, in order to implement high-speed transport or simultaneous mass transport of samples and transport in a plurality of directions that are required for improving the processing capacity of the sample processing devices, an electromagnetic transport method has been investigated.

Regarding an example of the electromagnetic transport method, for example, PTL 1 describes a laboratory sample distribution system including: a plurality of container carriers adapted to carry a sample container, each of the container carriers including at least one magnetically active device, preferably, at least one permanent magnet; a transport plane adapted to carry the container carriers; and a plurality of electromagnetic actuators adapted to apply a magnetic force to the container carriers to move the container carriers on the transport plane, the electromagnetic actuators being stationary disposed below the transport plane.

In addition, regarding an example of a sample transport method, PTL 2 discloses that a sample transport is performed by providing position sensors that detect positions of permanent magnets disposed in samples and exciting electromagnetic actuators corresponding to a desired transport direction based on the position information detected by the position sensors.

In the technique described in PTL 1, a container carrier detection device is provided to detect the position of the magnetically active device provided in the sample transport carrier.

In addition, the laboratory sample distribution system described in PTL 2 includes the transport plane. In addition, the plurality of electromagnetic actuators are disposed below the transport plane. Further, the plurality of position sensors are distributed on the transport plane. The position sensors are implemented as the Hall sensors.

However, in the above-described system described in PTL 1 or PTL 2, a plurality of container carrier detection devices are required, and a decrease in reliability caused by high cost or a malfunction of the detection device is concerned.

In addition, when some kind of abnormality occurs such that the container carrier deviates to a location outside a transport path where the electromagnetic actuator is not disposed, whether or not the container carrier is present needs to be detected, but a method of the detection is not disclosed in PTL 1. On the other hand, for example, a method of disposing a dedicated device for position detection of the container carrier at the position on the transport plane where the electromagnetic actuator is not disposed can be considered. However, the dedicated device needs to be added, which leads to an increase in costs.

In order to solve these problems, it is considered to implement a sensorless transport device without using a position detection device. However, a method of detecting a position of a container carrier with high accuracy without providing a detection device is an issue. In particular, unless a position where a transport container is present is accurately grasped during the start and restart of transport such as reactivation or power-on, it is difficult to perform transport stably with high accuracy, An object of the invention is to provide a transport device and an analysis system in which a stability of transport at a time of activation is further enhanced while achieving cost reduction by a position-sensorless configuration.

Solution to Problem

The invention includes a plurality of means for solving achieving the above-described object. For example, provided is a transport device configured to transport a transport container having a magnet or a magnetic body, the transport device including: a plurality of coils configured to generate a thrust to transport the transport container; a coil drive unit configured to apply a voltage to each of the plurality of coils; and a calculation unit configured to estimate a position of the transport container based on current information when a voltage pulse is applied to the coils, in which when a power supply of the device is activated, the calculation unit applies a voltage pulse in a positive direction and a voltage pulse in a negative direction to the target coils so as to detect the position of the transport container from the current information of current flowing through the coils.

Advantageous Effects of Invention

According to the invention, a stability of transport at a time of the start can be further enhanced while achieving cost reduction by a position-sensorless configuration. Objects, configurations, and effects other than those described above will be clarified by describing the following embodiment.

BRIEF DESCRIPTION OF DRAWINGS

FIG. 1 is a schematic configuration diagram of a transport device according to an embodiment of the present invention.

FIG. 2 is a schematic diagram showing a part of a cross-sectional configuration example of the transport device according to the embodiment.

FIG. 3 is a functional block diagram of a calculation unit of the transport device according to the embodiment.

FIG. 4 is a diagram showing a current change amount characteristic with respect to a position of a transport container.

FIG. 5 is a diagram showing a current change amount deviation (difference between presence and absence of the transport container) with respect to a position of the transport container.

FIG. 6 is an explanatory diagram of position coordinates in a top view of the transport device according to the embodiment.

FIG. 7 is a diagram for illustrating a voltage waveform (positive pulse) applied to a coil in order to detect a position of a transport container by the transport device of the embodiment and a current waveform corresponding to the voltage waveform.

FIG. 8 is a diagram for illustrating a voltage waveform (positive pulse) applied to a coil different from that of FIG. 7 and a current waveform corresponding to the voltage waveform.

FIG. 9 is a diagram for illustrating a voltage waveform (negative pulse) applied to a coil in order to detect a position of a transport container by the transport device of the embodiment and a current waveform corresponding to the voltage waveform.

FIG. 10 is a diagram for illustrating a voltage waveform (negative pulse) applied to a coil different from that of FIG. 9 and a current waveform corresponding to the voltage waveform.

FIG. 11 is an explanatory view of a change in a magnetic flux in a case where a transport container is located right above a coil in the transport device according to the embodiment.

FIG. 12 is an explanatory view of a change in a magnetic flux in a case where a transport container is located between coils in the transport device according to the embodiment.

FIG. 13 is an explanatory view of a remaining pattern of a transport container to be considered when a transport container position is detected in the transport device according to the embodiment.

FIG. 14 is an explanatory view of a remaining pattern of the transport container to be considered when the transport container position is detected in the transport device according to the embodiment.

FIG. 15 is an explanatory view of a remaining pattern of the transport container to be considered when the transport container position is detected in the transport device according to the embodiment.

FIG. 16 is an explanatory view of a remaining pattern of the transport container to be considered when the transport container position is detected in the transport device according to the embodiment.

FIG. 17 is an explanatory view of a remaining pattern of the transport container to be considered when the transport container position is detected in the transport device according to the embodiment.

FIG. 18 is a diagram for illustrating a voltage waveform (positive pulse) applied to a coil a plurality of times at time intervals and a current waveform corresponding to the voltage waveform in the transport device according to the embodiment.

FIG. 19 is a flowchart for illustrating a processing of a sample position estimation calculation unit in the transport device according to the embodiment.

FIG. 20 is a diagram for illustrating a schematic configuration example of an analysis system according to the embodiment.

DESCRIPTION OF EMBODIMENTS

An example of a transport device and an analysis system according to the invention will be described using FIGS. 1 to 20. In the drawings used in the present specification, the same or corresponding components are represented by the same or similar reference numerals, and the description of these components will not be repeated.

First, a schematic configuration of a sample transport device according to an embodiment of the invention will be described using FIG. 1. FIG. 1 is a diagram schematically illustrating the summary of the transport device according to the embodiment in which two coils 25 and a permanent magnet 10 operate relative to each other.

A transport device 1 illustrated in FIG. 1 is a device that transports a transport container 20 including the permanent magnet 10 to a target position, and includes the permanent magnet 10, the coils 25 each of which is configured with a cylindrical core 22 and a winding 21 wound around an outer circumferential side of the core, a drive circuit 50, a current detection unit 30, a calculation unit 40, and a power supply 55.

FIG. 2 is a schematic diagram illustrating a partial cross-sectional configuration example of the transport device 1 illustrated in FIG. 1. The transport container 20 such as a sample holder illustrated in FIG. 2 is configured such that a holding unit of the sample container that holds a sample and the permanent magnet 10 are integrated. The transport container 20 is disposed to face the coil 25 through a transport surface 15.

As the permanent magnet 10 provided in the transport container 20, for example, a permanent magnet such as neodymium or ferrite is used. In the first embodiment, the permanent magnet 10 is used in the description. However, another magnet or a soft magnetic body can be used instead of the permanent magnet 10. In addition, the permanent magnet 10 and a soft magnetic body can be used in combination.

Typically, the transport device 1 causes a current to flow through the winding 21 of the coil 25 to generate an electromagnetic force in the core 22, performs a control such that the permanent magnet 10 disposed in the transport container 20 moves relatively above a region between the plurality of coils 25 (between the coil 25 and the coil 25) and on the transport surface 15, and transports the transport container 20 to a desired position.

In the transport device 1, relative position information regarding the permanent magnet 10 and the coils 25 is required. The reason for this is to efficiently act, on the permanent magnet 10, the electromagnetic force generated in the core 22 by causing a current to flow through the winding 21 of the coil 25 and is to efficiently move the permanent magnet 10 in a desired direction.

For example, a case where the permanent magnet 10 is above (right above) one of the two coils 25 is assumed. Even when a voltage is applied to a winding 21*a* of a coil 25*a* right below the permanent magnet 10, a thrust in the transport direction is not generated in the permanent magnet 10.

On the other hand, when a voltage is applied to a winding 21*b* of a coil 25*b* above (right above) which the permanent magnet 10 is not present, that is, that is not present right below the permanent magnet 10, a force to attract the permanent magnet 10 to the coil 25*b* is generated, and a thrust in the transport direction is generated.

That is, by applying a voltage to the winding 21 of the desired coil 25, a force in the transport direction can be efficiently generated in the permanent magnet 10. By appropriately selecting the winding 21 of the coil 25 to which a voltage is applied, the orientation (direction) of the force in the transport direction can be controlled.

In the invention, it is desired to detect the position of the transport container 20 without moving the transport container 20 during the restart of the device. Therefore, it is desired to apply a current at which the permanent magnet 10 does not move even when the permanent magnet 10 is not present right above the coil 25.

Next, a method of estimating the position of the transport container 20 without using a position sensor will be described. First, when the permanent magnet 10 is present on the coil 25 on the proximal side of FIG. 1, a magnetic flux formed by the permanent magnet 10 acts on the coil 25. Here, there is a difference in the magnitude of the magnetic flux to act between the coil 25 close to the permanent magnet 10 and the coil 25 far from the permanent magnet 10. That is, the magnitude of the magnetic flux to act on the coil 25 changes depending on the relative position between the permanent magnet 10 and the coil 25.

The core 22 is formed of a magnetic body, and a magnetic flux passing through the core 22 has a characteristic in which the magnetic flux is less likely to pass through the core 22 as the size thereof increases. Here, when a voltage is applied to the winding 21 to cause a current to flow, a magnetic flux formed by the current is generated in the core 22. Accordingly, a magnetic flux generated by the permanent magnet 10 and a magnetic flux generated by the current flowing through the winding 21 are present in the core 22.

In general, when a current flows through the winding 21, a magnetic field is generated around the winding 21, and the generated magnetic flux is proportional to the current value flowing therethrough. This constant proportionality is called an inductance. However, in a circuit including a magnetic body such as the core 22, the inductance changes depending on a saturation characteristic of the core 22.

When saturation occurs in the core 22, the inductance changes depending on the magnitude of the magnetic flux generated in the core 22. That is, the inductance of the winding 21 changes depending on the magnitude of the magnetic flux of the permanent magnet 10. This implies that the inductance of the winding 21 changes depending on the position of the permanent magnet 10.

A voltage V generated in the winding 21 is as follows.

$$V=-d\phi/dt \qquad (1)$$

Here, $\phi$ represents a magnetic flux, and t represents time. The voltage V is represented by a change amount of the magnetic flux per unit time.

In addition, assuming that I represents a current and L represents an inductance, a relationship of the following expression is satisfied.

$$dI/dt=(1/L)\times(d\phi/dt) \qquad (2)$$

A relationship of the following expression is satisfied from Expression (1) and Expression (2).

$$dI/dt=-V/L \qquad (3)$$

That is, when a given voltage is applied to the winding 21, as shown in Expression (3), a time derivative of the current I supplied changes depending on the magnitude of the inductance L. This implies that the rise of the current supplied varies when the voltage is applied.

Accordingly, when the voltage is applied to the winding 21, the inductance L can be obtained by calculation by detecting the current flowing through the winding 21 and a flowing form thereof. That is, as long as the inductance L of the winding 21 that changes depending on the position of the permanent magnet 10 can be detected, the position of the permanent magnet 10 that affects the inductance can be obtained.

To that end, the drive circuit 50 is connected to the winding 21 of the coil 25, and the current detection unit 30 that detects the current value flowing through the winding 21 is provided. As a result, in the calculation unit 40, the position of the transport container 20 is estimated based on current information when voltage pulses 80 and 81 are applied to the coils 25*a* and 25*b*.

In the embodiment, a voltage is applied to the winding 21 by the drive circuit 50, and a current value generated by the voltage is detected by the current detection unit 30. In addition, as the current detection unit 30 that detects a current, a device using a series resistor or a current transformer or a device using a Hall current sensor can be considered. However, the embodiment is not particularly limited to these devices.

Here, in the invention, in order to prevent liquid leakage, it is desired to the magnitude such that a thrust on the transport container 20 is not generated by the voltage pulse application for position detection.

The drive circuit 50 is connected to the power supply 55, receives a current from the power supply 55, and supplies the current to the windings 21 of the coils 25 to apply a voltage to each of the plurality of coils 25*a* and 25*b*.

The calculation unit 40 calculates a relative positional relationship between the coil 25 and the permanent magnet 10 based on the current value detected by the current detection unit 30, and estimates the position of the permanent magnet 10 in the transport device 1. In addition, using the calculated position information of the permanent magnet 10, the calculation unit 40 determines a timing at which a current required for driving the permanent magnet 10 is supplied from the drive circuit 50 and supplies the current to the appropriate coil 25.

In the invention, when a power supply of the device is activated, the calculation unit 40 applies the voltage pulse 80 (refer to FIG. 7 or the like) in a positive direction corresponding to at least one pulse and the voltage pulse 81 (refer to FIG. 9 or the like) in a negative direction corresponding to at least one pulse to the target coils 25*a* and 25*b* so as to detect the position of the transport container 20 from the current information of current flowing through the coils 25*a* and 25*b*. The details of this configuration will be described below.

The time when the power supply of the device is activated refers to, in the transport device that configures the analysis system, the time after various power supplies are activated, for example, the time of activation for the start of analysis or the time of restart from accidental stop.

An example of this position detection control of the transport container 20 at the time is shown in a block diagram of FIG. 3. As shown in FIG. 3, in the calculation unit 40, the magnitude or duty ratio of the voltage pulse to be applied is calculated in a duty setting unit 60 based on the order determined in an electric coil decision unit 63 and is output to the drive circuit 50. In addition, the electric coil decision unit 63 outputs a start-up command signal in advance to the drive circuit 50 that is scheduled to apply the voltage pulse.

Here, information regarding the order of energization to the coils 25 during position detection and during typical transport is stored in the electric coil decision unit 63 in advance. The order of energization during position detection is not particularly limited, and examples thereof include a configuration in which all of the coils are energized at the same time and a configuration in which the coils are energized in order from the coil 25 at the outermost position in the transport device 1. As the order of energization during typical transport, a configuration where a transport path that is determined based on an instruction of a transport destination from a control computer 101 of FIG. 20 described below is implemented can be considered.

In addition, when the voltage pulse is output to the coil, the current value is detected in the current detection unit 30, the current change amount (dI/dt) of the coil is calculated in a current change amount calculation unit 61, and the position of the transport container 20 is estimated based on the value in a sample position estimation calculation unit 62. The estimation result is transmitted to, for example, an external server 65 or the like that manages the state of the transport device 1. The control blocks described herein can be implemented by an arithmetic device such as a microcomputer.

FIG. 4 is a graph in which the horizontal axis represents the distance from the selected nearest coil 25 and the vertical axis represents the current change amount when the transport container 20 is present and when the no transport container 20 is present. In FIG. 5, the horizontal axis represents the distance from the same coil 25 as that of FIG. 4, and the vertical axis represents a characteristic of a difference between the presence and the absence of the transport container 20. This way, by using the characteristic of FIG. 5, the distance from the selected coil 25 corresponding to the current change amount can be recognized. Accordingly, it is desirable that the current information used in the calculation unit 40 is a current change amount which is a difference between a maximum current and a minimum current flowing through the coils 25*a* and 25*b* when the voltage pulse 80 in the positive direction and the voltage pulse 81 in the negative direction are applied.

Next, FIG. 6 is an overview when the transport surface 15 of the transport device is seen from the top. After applying a current to detect the position of the transport container 20 from the current change amount, as means for notifying the position information, for example, XY coordinates of the position are transmitted to the external server 65 or the like. The coordinate axes can be freely set, but the lower left coil is set as (0,0) in the embodiment.

Regarding the coil 25 that is disposed right below the transport surface 15, when one coil 25 is excited, the transport containers 20 on the coil 25 adjacent to the coil 25 in the upper, lower, right, and left directions are attracted. That is, in order to more reliably prevent easy collision between a plurality of transport containers 20 that are disposed, it is desirable to dispose the transport path in a grid shape made of every other column and every other row as shown in FIG. 6 without densely laying the coils 25. As a result, in a region other than the transport path, the coil 25 can be removed. As a result, additional effects can also be obtained in that, for example, the parts costs can be reduced or the weight can be reduced.

When the distance between the coils 25 (the distance between the centers of the coils 25) is represented by d, the distance between the transport container 20 and the coil 25 on the transport surface 15 is d at a maximum (the maximum distance when the transport container 20 deviates from the transport path and enters a portion where the core 22 is not present). On the other hand, the distance between the transport container 20 and the coil 25 on the transport path is d/2 at a maximum.

A current waveform corresponding to a voltage waveform that is applied to the coil to detect the position of the transport container 20 in the transport device 1 will be described. FIGS. 7 to 10 are diagrams for illustrating a voltage waveform applied to a coil in order to detect the position of the transport container 20 in the transport device 1 and a current waveform corresponding to the voltage waveform.

The magnitude (V) or the pulse width (T) of the voltage pulse 80 is determined depending on the magnitude of the voltage applied to the coil 25. When the permanent magnet 10 of the transport container 20 approaches the coil 25, the current waveform changes from a current waveform 70*a* illustrated in FIG. 7 to a current waveform 70*b* illustrated in FIG. 8 due to the magnetic saturation of the coil 25.

The same can also be applied to a case where the voltage pulse 81 in the negative direction is applied, and when the permanent magnet 10 of the transport container 20 approaches the coil 25, the current waveform changes from a current waveform 70*c* illustrated in FIG. 9 to a current waveform 70*d* illustrated in FIG. 10 due to the magnetic saturation of the coil 25.

In a case where the positive pulse is applied, when the coil 25 is not affected by the permanent magnet 10 of the transport container 20 as illustrated in FIG. 7, the current change amount is I1.

On the other hand, when the coil 25 is affected by the permanent magnet 10 of the transport container 20 as illustrated in FIG. 8, for example, when the permanent magnet 10 is present right above or near the coil 25, the current change amount is 12 that is more than I1.

In addition, in a case where the negative pulse is applied, when the coil 25 is not affected by the permanent magnet 10 of the transport container 20 as illustrated in FIG. 9, the current change amount is 13.

On the other hand, when the coil 25 is affected by the permanent magnet 10 of the transport container 20 as illustrated in FIG. 10, for example, when the permanent magnet 10 is present right above or near the coil 25, the current change amount is 14 that is more than 13. Note that 13 and 14 are negative values.

Next, the improvement of the detection performance of the position of the transport container 20 by the use of the positive and negative voltage pulses will be described using FIGS. 11 and 12. FIGS. 11 and 12 are diagrams illustrating a change in magnetic flux caused by a difference in a positional relationship between the transport container 20 and the magnet.

When the permanent magnet 10 is present right above the coil 25 as illustrated in FIG. 11, a magnetic flux formed by the magnet passes from the upper portion to the lower portion of the coil 25*a*. As described above, in the invention, the position of the transport container 20 is detected by increasing the magnetic flux to generate magnetic saturation such that the current change amount of the coil 25 changes. Therefore, the position detection accuracy of the transport container 20 is improved by applying the positive voltage pulse in the direction in which the magnetic saturation increases such that a positive current flows.

Next, when the position of the transport container 20 is distant from the coil 25 as illustrated in FIG. 12, a magnetic flux formed by the magnet passes from the lower portion to the upper portion of the coil 25*a*. In addition, the same magnetic flux is also generated on the coil 25*b* side. This way, when the permanent magnet 10 and the coil 25 are separated from each other by a predetermined distance, the orientation of the magnetic flux formed by the permanent magnet 10 is reversed. Therefore, in order to form magnetic saturation, it is necessary to improve the position detection accuracy of the transport container 20 by applying the negative voltage pulse such that a negative current flows.

FIGS. 11 and 12 illustrate the case where the upper surface side of the permanent magnet 10 is the S pole and the lower surface side thereof is the N pole. Even when the orientation of SN is reversed, the same can be applied. Note that, when the orientation of SN is reversed, it is desirable to apply the negative voltage pulse when the transport container 20 is present right above the coil 25, and it is desirable to apply the positive pulse when the transport container 20 is present between the coil 25 and the coil 25. That is, it is desirable to further improve the detection accuracy by controlling a combination of the orientation of the permanent magnet 10 and the voltage pulse that is applied to the coil 25 such that magnetic saturation is likely to occur.

Patterns in which the transport container 20 can remain when the device is stopped are illustrated in FIGS. 13 to 17. For convenience of simplicity, assuming that the transport container 20 is present near the coordinate axes (0,0), a position detection method for each of the remaining patterns of the transport container 20 will be described. The detailed procedure of the specific position detection method of the transport container 20 will be described below.

FIG. 13 illustrates a case where the transport container 20 is present right above one coil 25 among the coils 25. In this case, the position is detected based on the current change amount when the coil 25 at the coordinates (1,2) is excited.

FIG. 14 illustrates a case where the transport container 20 is present between two coils 25 among the coils 25. In this case, the position is detected based on the respective current change amounts when two coils 25 at the coordinates (1,2) and (2,2) are excited.

FIG. 15 illustrates a case where the transport container 20 is present at the same distance from three coils 25 among the coils 25. In this case, the position is detected based on the respective current change amounts when three coils 25 at the coordinates (0,0), (0,1), and (1,0) are excited.

FIG. 16 is similar to FIG. 14 and illustrates a case where the transport container 20 is present in a direction in which the coil 25 is not present on one side. In this case, the position is detected based on the current change amount when the coil 25 at the coordinates (2,1) is excited. In this case, unlike the case illustrated in FIG. 14, the position where no core 22 is present is near the transport container 20. Therefore, only one coil 25 that can be excited is present near the transport container 20, and it is necessary to determine whether the transport container 20 is present in the left direction or in the right direction in FIG. 16 when seen from the coil 25 at the coordinates (2,1). Accordingly, as an additional process, the position is detected based on the current change amounts when the four coils 25 at the coordinates (1,0), (3,0), (1,2) and (3,2) of four corners in a view from the coil at the coordinates (2,1) are excited. In FIG. 16, the positions are specified based on the current change amount when the coil 25 at the coordinates (1,0) and (3,0) are excited.

FIG. 17 illustrates a case where the transport container 20 is present at a position where the coil 25 is not present. In this case, the position is detected based on the respective current change amounts when the four coils 25 at the coordinates (0,1), (1,0), (1,2), and (2,1) adjacent to the transport container 20 are excited.

Accordingly, in the invention, the voltage pulses 80 and 81 illustrated in FIGS. 7 to 10 are sequentially applied to all of the coils 25 on the transport surface 15, in FIG. 6, to all of the coils at the coordinate (0,0) to the coordinate (m,n), and the position of the transport container 20 is detected based on the respective current change amounts.

Actually, for example, a case where the transport container 20 remains at a position that slightly deviates from the position right above the coil 25 in FIG. 13 can also be considered. This case is classified into any one of the above-described five patterns depending on the deviation degree, and the positional relationship between the transport container 20 and the coils 25*a* and 25*b* in the coordinate system is output based on the magnitude of the current change amount.

When the positive and negative voltage pulses are output, an output method is illustrated in FIG. 18. When the voltage pulses are actually applied, the same current change amount is not always detected even from the same position of the transport container 20, and a variation such as a current change amounts 70*e*1, 70*e*2, or 70*e*3 is present.

Here, in the invention, in order to prevent the movement of the transport container 20, it is desired to detect the position of the transport container 20 with a low voltage pulse. When the voltage pulse is low, a difference in current change amount depending on the position of the transport container 20 is small. That is, it is difficult to detect the position. Therefore, it is desirable to suppress the above-described variation to ensure high position detection accuracy.

Accordingly, depending on the degree of the variation, as illustrated in FIG. 18, it is desired to perform a process of reducing the variation by applying the voltage pulse 80 in the positive direction and the voltage pulse 81 in the negative direction to the same coil 25 multiple times and performing the averaging process or the like.

When the positive and negative voltage pulses are applied multiple times, the order of applying the positive and negative voltage pulses is not particularly limited. A configuration where the voltage pulse 81 in the negative direction is continuously applied after continuously applying the voltage pulse 80 in the positive direction, a configuration where the voltage pulse 80 in the positive direction and the voltage pulse 81 in the negative direction are alternately applied multiple times, or a configuration where, after continuously applying the voltage pulse 80 in the positive direction, the voltage pulse 81 in the negative direction is continuously applied and subsequently the voltage pulse 80 or 81 in the positive direction or the negative direction is further applied may be adopted.

In addition, the number of times of the application is desirably 2 or more times but is not particularly limited. Note that, in consideration of a balance between variation suppressing and a reduction in the time of position detection, it is desirable to apply the voltage pulse 80 in the positive direction and the voltage pulse 81 in the negative direction the same number of times.

Further, the interval of the voltage pulses 80 and 81 to be applied is not particularly limited. It is desirable to apply the next pulse after a predetermined time T1 is elapsed from the one pulse application.

Next, the flow of the position detection of the transport container 20 according to the embodiment during activation will be described with reference to FIG. 19. FIG. 19 is a flowchart illustrating a procedure of detection for each position of the transport container 20 in the sample position estimation calculation unit 62.

As illustrated in FIG. 19, after the start of the process (Step S1000), the positive voltage pulse for position detection is sequentially applied to all of the coils 25 on the transport surface 15 N times (Step S1001A). Next, the negative voltage pulse for position detection is sequentially applied to all of the coils 25 on the transport surface 15 N times (Step S1001B).

Next, an averaging processing of the current change amounts detected when the positive and negative pulses are applied to the coils 25 is performed (Step S1002). Here, the averaging processing corresponds to a pre-processing for performing the position detection of the transport container 20.

Next, whether or not the current change amount when the positive voltage pulse is applied is a predetermined current change amount |c1| or more is determined (Step S1003).

When it is determined that the current change amount is |c1| or more, the process proceeds to Step S1004, it is determined that the transport container 20 is present right above the excited coil (FIG. 13) (Step S1004), and the determination process ends (Step S1014).

On the other hand, when it is determined that the current change amount is less than |c1|, whether or not both of the current change amounts when the negative voltage pulse is applied to two adjacent coils are |c2| or more is determined (Step S1005).

When it is determined that the current change amounts are |c2| or more, the process proceeds to Step S1006, it is determined that the transport container 20 is present between the corresponding two coils (FIG. 14) (Step S1006), and the determination process ends (Step S1014).

On the other hand, when it is determined that the current change amounts are less than |c2|, whether or not all of the current change amounts when the negative voltage pulse is applied to three adjacent coils are |c3| or more is determined (Step S1007).

When it is determined that the current change amounts are |c3| or more, the process proceeds to Step S1008, it is determined that the transport container 20 is present at a position (FIG. 15) adjacent to the corresponding three coils (Step S1008), and the determination process ends (Step S1014).

On the other hand, when it is determined that one or more of the current change amounts are less than |c3|, whether or not the current change amounts when both of the positive and negative voltage pulses are applied are |c4| or more and whether or not the sum of the current change amounts when the negative voltage pulse is applied to two of the coils at the four corners is |c5| or more are determined (Step S1009).

When it is determined that all of the determination conditions are satisfied in Step S1009, the process proceeds to Step S1010, it is determined that the transport container 20 is present at a position (FIG. 16) at a distance of d/2 from the coil in a direction to the position where no core 22 is present (Step S1010), and the determination process ends (Step S1014).

On the other hand, when it is not determined that all of the determination conditions are satisfied in Step S1009, whether or not the current change amounts when the negative voltage pulse is applied to three or more coils among four coils most adjacent to the position where no core 22 is present are |c6| or more is determined (Step S1011).

When it is determined that all of the determination conditions are satisfied in Step S1011, the process proceeds to Step S1012, it is determined that the transport container 20 is present at the position where no core 22 is present (FIG. 17) (Step S1012), and the determination process ends (Step S1014).

On the other hand, when it is determined that all of the determination conditions are not satisfied in Step S1011, it is determined that no transport container 20 is present (Step S1013), and the determination process ends (Step S1014).

The analysis system according to the embodiment of the invention to which the transport device according to the embodiment is suitably applied will be described using FIG. 20. FIG. 20 is a diagram for illustrating a schematic configuration example of the analysis system according to the embodiment.

An analysis system 100 illustrated in FIG. 20 includes the control computer 101, a plurality of analysis devices 102, and a plurality of transport devices 1 that transport the transport container 20 between the analysis devices 102.

The number of the analysis devices 102 or the transport devices 1 varies depending on the kind or the analysis content of a sample to be analyzed and may be one or more.

In addition, in the analysis system 100, various sample pre-processing and post-processing units that execute pre-processing or post-processing on the sample in the transport container 20 can be provided. The detailed configuration or the number of the sample pre-processing and post-processing units is not particularly limited, and one or more configurations of well-known pre-processing devices can be adopted.

The control computer 101 executes an overall control of the system such as designation of the transport path through which the transport container 20 is transported or the order of analysis. In addition, the control computer 101 executes a designated operation in response to an instruction input from an operator.

Next, the effect of the embodiment will be described.

The transport device 1 in the analysis system 100 according to the embodiment includes: the plurality of coils 25*a* and 25*b* configured to generate a thrust to transport the transport container 20; the drive circuit 50 configured to apply a voltage to each of the plurality of coils 25*a* and 25*b*; and the calculation unit 40 configured to estimate a position of the transport container 20 based on current information when the voltage pulses 80 and 81 are applied to the coils 25*a* and 25*b*, in which when a power supply of the device is activated, the calculation unit 40 applies the voltage pulse 80 in the positive direction and the voltage pulse 81 in the negative direction to the target coils 25*a* and 25*b* so as to detect the position of the transport container 20 from the current information of current flowing through the coils 25*a* and 25*b*.

With the above-described configuration, the sensorless transport device can be implemented without using a dedicated sensor for detecting the position of the transport target. In addition, when the device is stopped due to an accidental event such as power outrage or when the device is activated, for example, at the start of the analysis operation, the position of the transport target can be specified with high accuracy. Therefore, the transport of the transport container 20 can start smoothly, and the stable transport of a sample can be implemented.

In addition, the current information used in the calculation unit 40 is a current change amount which is a difference between a maximum current and a minimum current flowing through the coils 25*a* and 25*b* when the voltage pulse 80 in the positive direction and the voltage pulse 81 in the negative direction are applied. Therefore, the distance from the target coil 25 to the transport container 20 can be more accurately estimated, and the more stable sensorless transport device 1 can be implemented.

Further, positive and negative of the voltage pulses 80 and 81 are changed according to an orientation of the permanent magnet 10. As a result, the position estimation corresponding to the state of the magnetic body provided in the transport container 20 can be performed with high accuracy.

In addition, the calculation unit 40 outputs the positional relationship between the transport container 20 and the coils 25*a* and 25*b* in the coordinate system based on the magnitude of the current change amount. As a result, the position estimation of the transport container 20 can be more easily executed with high accuracy.

Here, when the transport device 1 is used, a case where the device power supply is shut down due to power outrage or some kind of malfunction and then restarts can be assumed. At the time of restart, the transport container 20 remains on the transport surface 15, but it is desirable that the transport can smoothly start even in this state. In the configuration where the position sensor is provided as in PTLs 1 and 2, the position can be detected, and thus there is no particular problem. However, in the invention, the position of the transport container 20 is estimated based on the current information. Therefore, it is necessary to apply the voltage pulses for position estimation to the coils 25.

In addition, when the power supply is shut down at an unintended timing, the position of the transport container 20 immediately after the shutdown is unclear. Therefore, when a current is carelessly applied to the coil 25 such that an unintended thrust is generated, the transport container 20 may be transported in an unintended direction, and when the transport target is liquid such as a sample, unexpected liquid leakage may be concerned.

Accordingly, the voltage pulses 80 and 81 have a magnitude that no thrust is generated with respect to the transport container 20. As a result, when the position detection of the transport container 20 is performed, movement of the transport container 20 in an unintended direction by the voltage pulses 80 and 81 or the occurrence of inconvenience such as liquid leakage can be suppressed, and the transport of the transport container 20 can be implemented with higher speed and reliability.

In addition, an interval for applying the voltage pulse 80 in the positive direction and the voltage pulse 81 in the negative direction is kept at a predetermined time. As a result, unintended movement of the transport container 20 by continuous application of the voltage pulses 80 and 81 can be further suppressed.

In addition, the voltage pulses 80 and 81 are applied in a manner such that the voltage pulse 80 in the positive direction is applied separately in a plurality of times and the voltage pulse 81 in the negative direction is applied separately in a plurality of times. As a result, when voltage pulse is applied once, a variation can be reduced, and the position can be estimated with higher accuracy.

Further, the voltage pulse 80 in the positive direction and the voltage pulse 81 in the negative direction are applied the same number of times. As a result, the voltage pulse 80 in the positive direction and the voltage pulse 81 in the negative direction can be inhibited from being applied a number of times more than necessary for the position estimation, and the application of the voltage pulse can be implemented with a good balance where the accuracy of the position estimation can be sufficiently improved.

<Others>

The present invention is not limited to the above-described embodiment, and various modifications and applications can be made. The embodiment has been described in detail in order to easily describe the present invention, and the present invention is not necessarily to include all the configurations described above.

REFERENCE SIGNS LIST

- 1: transport device
- 10: permanent magnet (magnetic body)
- 15: transport surface
- 20: transport container
- 21, 21*a*, 21*b*: winding
- 22, 22*a*, 22*b*: core
- 25, 25*a*, 25*b*: coil
- 30: current detection unit
- 40: calculation unit
- 50: drive circuit (coil drive unit)
- 55: power supply
- 60: duty setting unit
- 61: current change amount calculation unit
- 62: sample position estimation calculation unit
- 63: electric coil decision unit
- 65: external server
- 70*a*, 70*b*, 70*c*, 70*d*: current waveform
- 70*e*1, 70*e*2, 70*e*3: current change amount
- 80, 81: position detection voltage pulse
- 100: analysis system
- 101: control computer
- 102: analysis device

The invention claimed is:

1. A transport device configured to transport a transport container having a magnet or a magnetic body, the transport device comprising:

a plurality of coils configured to generate a thrust to transport the transport container;

a coil drive unit configured to apply a voltage to each of the plurality of coils; and a calculation unit configured to estimate a position of the transport container based on current information when a voltage pulse is applied to the coils, wherein when a power supply of the device is activated, the calculation unit applies a voltage pulse in a positive direction and a voltage pulse in a negative direction to the target coils so as to detect the position of the transport container from the current information of current flowing through the coils, the current information used in the calculation unit is a current change amount which is a difference between a maximum current and a minimum current flowing through a coil when the voltage pulse in the positive direction and the voltage pulse in the negative direction are applied, and the calculation unit is configured to determine whether the transport container is present right above a coil when a voltage pulse in a first direction is applied to the coils and to determine whether the transport container is present at a position distant from the coil when a voltage pulse in a second direction is applied to the coils.

2. The transport device according to claim 1, wherein the calculation unit outputs a positional relationship between the transport container and the coils in a coordinate system based on a magnitude of the current change amount.

3. The transport device according to claim 1, wherein positive and negative of the voltage pulse is changed according to an orientation of the magnet or the magnetic body.

4. The transport device according to claim 1, wherein the voltage pulses are applied in a manner such that the voltage pulse in the positive direction is applied separately in a plurality of times and the voltage pulse in the negative direction is applied separately in a plurality of times.

5. The transport device according to claim 4, wherein the voltage pulse in the positive direction and the voltage pulse in the negative direction are applied the same number of times.

6. The transport device according to claim 1, wherein the voltage pulse has a magnitude that no thrust is generated with respect to the transport container.

7. The transport device according to claim 1, wherein an interval for applying the voltage pulse in the positive direction and the voltage pulse in the negative direction is kept at a predetermined time.

8. An analysis system comprising:

the transport device according to claim 1.

* * * * *